United States Patent
Miller

(10) Patent No.: US 10,769,897 B1
(45) Date of Patent: Sep. 8, 2020

(54) SECURING A CARDLESS ATM AUTHENTICATION THROUGH POSITION DETECTION

(71) Applicant: Capital One Services, LLC, McLean, VA (US)

(72) Inventor: Mitchell Miller, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/746,619

(22) Filed: Jan. 17, 2020

(51) Int. Cl.
*G07F 19/00* (2006.01)
*H04W 12/12* (2009.01)
*H04W 12/06* (2009.01)
*H04W 12/04* (2009.01)

(52) U.S. Cl.
CPC .......... *G07F 19/207* (2013.01); *G07F 19/204* (2013.01); *H04W 12/0401* (2019.01); *H04W 12/0609* (2019.01); *H04W 12/12* (2013.01)

(58) Field of Classification Search
CPC ............... G07F 19/207; G07F 19/204; H04W 12/0609; H04W 12/0401; H04W 12/12
USPC ....................................................... 235/379
See application file for complete search history.

(56) References Cited

U.S. PATENT DOCUMENTS

| 7,686,213 B1* | 3/2010 | Ramachandran .... G06Q 20/042 235/379 |
| 9,564,985 B2 | 2/2017 | Ray et al. |
| 9,916,736 B2 | 3/2018 | Block et al. |
| 10,121,331 B1 | 11/2018 | Hodges et al. |
| 10,229,294 B1 | 3/2019 | Giobbi et al. |
| 2008/0313079 A1* | 12/2008 | Van Bosch ............ G06Q 20/20 705/44 |
| 2018/0240097 A1* | 8/2018 | Chauvin .............. G06Q 20/325 |
| 2019/0045515 A1 | 2/2019 | Kwasnick et al. |

* cited by examiner

*Primary Examiner* — Daniel A Hess
(74) *Attorney, Agent, or Firm* — Sterne, Kessler, Goldstein & Fox P.L.L.C.

(57) ABSTRACT

Systems and methods include a kiosk that performs an electronic payment transaction based on instructions received from a portable device of a user. The system further includes a transmitting device electrically coupled to the kiosk. The transmitting device is configured to transmit a first signal to the portable device at a first direction. The system further includes a receiving device electrically coupled to the kiosk. The receiving device is configured to receive a second signal from the portable device at a second direction. The transmitting device and receiving device are positioned such that the first and second direction enable determination of a position of the user, where the processor enables the electronic payment transaction to be processed only when the portable device is at a location relative to the kiosk. The location is disposed within a transmission path coextensive with both the first direction and the second direction.

20 Claims, 9 Drawing Sheets

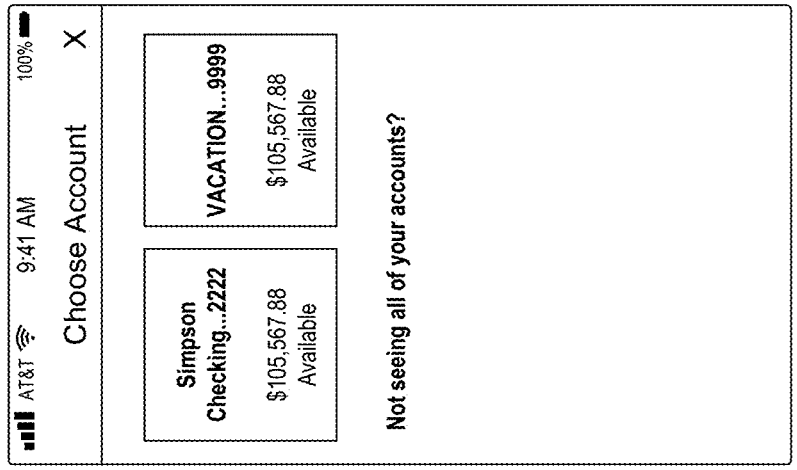
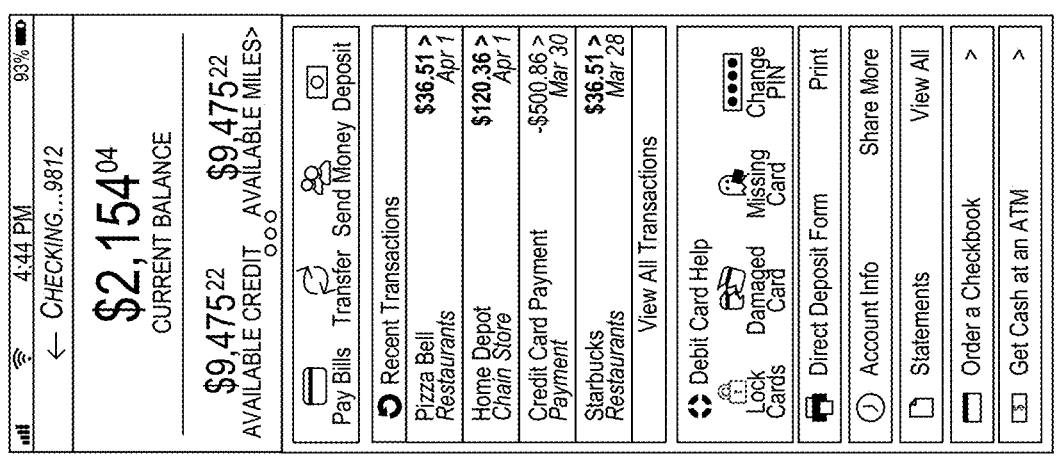
FIG. 5A
FIG. 5B

FIG. 5D

Choose Amount screen:
- AT&T 9:41 AM 100%
- Choose Amount  X
- Get cash from:
- Checking Account ....0987
- $11,435.12 Available
- Amount:
- $20
- Choose Amount   Done
- $20
- $40
- $60

FIG. 5C

Confirm Details screen:
- AT&T 9:41 AM 100%
- Confirm Details  X
- Get cash from:
- Checking Account ....0987
- $11,435.12 Available
- Amount:
- $60
- Confirm Details

SECURING A CARDLESS ATM AUTHENTICATION THROUGH POSITION DETECTION

BACKGROUND

An automated teller machine (ATM) enables customers of financial institutions to perform financial transactions, such as cash withdrawals, deposits, transfer funds, or obtain account information. As the ATM operates in an automated fashion, such financial transactions may be generally performed at any time of day and/or any day of the week, electronically, and without the need for direct interaction with bank staff.

Ever increasing security challenges plague ATMs, posing substantial financial losses and risk to financial institutions and their clients. Moreover, as financial transactions can increasingly involve mobile or other portable devices to facilitate transactions, man-in-the-middle (MitM) attacks can create additional challenges.

BRIEF DESCRIPTION OF THE DRAWINGS/FIGURES

FIG. 5A through 5H illustrate a wireframe of a mobile device ATM fulfillment process, in accordance with an embodiment.

DETAILED DESCRIPTION

As described above, man-in-the-middle attacks present security challenges. In the context of ATMs, an attacker with physical proximity can intercept financial transactions. For example, a customer who attempts to withdraw money from an ATM via a mobile phone application may encounter another person ahead in line at the ATM. A system should enable the ATM to dispense cash only after ensuring that the user is present in front of the ATM that is authorized to dispense the cash.

Provided herein are system, apparatus, device, method and/or computer program product embodiments, and/or combinations and sub-combinations thereof, for conducting ATM transactions. Many banks presently offer a mobile app experience that allows account holders to conduct a variety of transactions. For example, an account holder may use the mobile app to transfer funds from a savings account to a checking account, or pay bills from their funds. Embodiments verify that the individual is in front of the ATM to avoid the man-in-the-middle attacks described above.

To verify a position of an ATM user, antennas, such as directional antennas, may be configured to interact with a mobile device of the ATM user. In this way, embodiments verify that the user is present in front of the ATM that is used for the withdraw. By verifying that the user is present in front of the ATM, security is improved.

The modules, units, and services in the following description of the embodiments can be coupled to one another as described or as shown. The coupling can be direct or indirect, without or with intervening items between coupled modules, units, or services. The coupling can be by physical contact or by communication between modules, units, or services.

Figure 1:
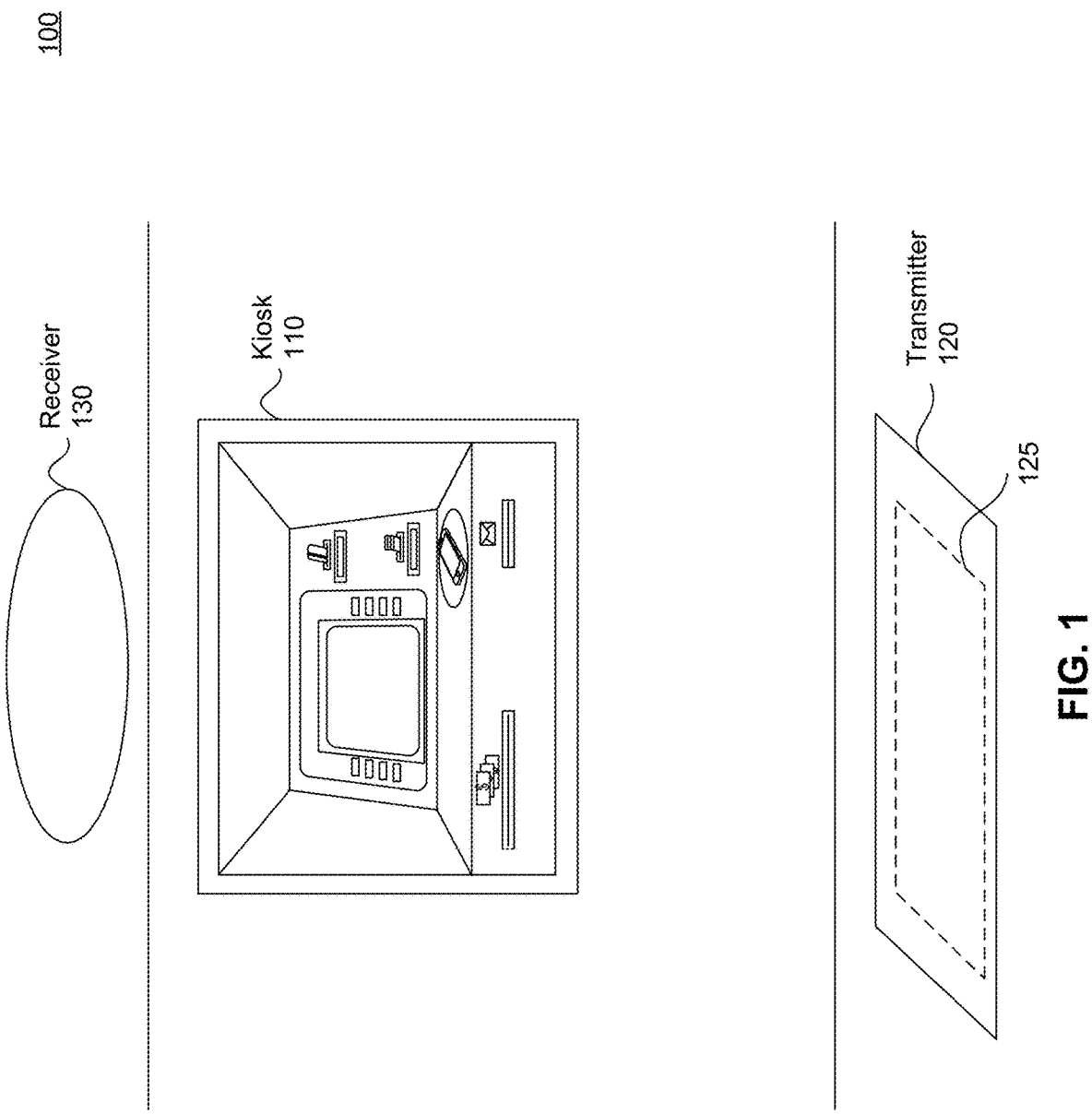
FIG. 1 illustrates a terminal system, in accordance with some embodiments.

FIG. 1 illustrates a computerized financial terminal system. As described in detail below, the system permits a customer to make real-time financial inquiries and transactions when present at the terminal system. In some embodiments, the terminal system 100 can be an ATM system to transact using a secure connection. In some embodiments, terminal system 100 can be a cardless ATM system enabling the customer 112 to conduct a device-based transaction.

Terminal system 100 can include a kiosk 110, a transmitter 120, a sensor 125, and a receiver 130. Kiosk 110 can include one or more processors, which can be configured to perform an electronic payment transaction. Transmitter 120, the sensor 125 and receiver 130 can be connected to kiosk 110. For example, transmitter 120, the sensor 125 and receiver 130 can be connected with the kiosk to provide an interface through which a customer can associate with a bank. In one example, kiosk 110 is an ATM kiosk that can communicate with a portable device of a customer through transmitter 120 and receiver 130. The components and arrangement of the components included in terminal system 100 may vary. Thus, terminal system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

Transmitter 120 and receiver 130 can include directional antennas positioned in a manner that enables a transaction to be performed by cardless ATM system when the customer is present before kiosk 110. Specifically, transmitter 120 can be electrically coupled to kiosk 110 and configured to transmit a first signal to a customer's portable device at a first direction. In one example, transmitter 120 can be disposed within a mat, and configured to transmit a signal in a direction perpendicular to the floor, i.e., up. Receiver 130 can also be electrically coupled to kiosk 110 and configured to receive a second signal from the customer's portable device at a second direction. In one example, receiver 130 can be disposed overhead and receive a second signal from a customer's portable device situated below receiver 130. In some embodiments, transmitter 120 and receiver 130 are positioned such that the first and second direction enable determination of a position of the user.

Further, although an exemplary wall-mounted arrangement is shown, the physical arrangement of kiosk 110 may vary and is not limited to this arrangement. For example, kiosk 110 can be part of a terminal system provided in a financial institution (e.g., a bank, an office, a department providing financial services, etc.) or other location. In some embodiments, an employee representing the financial institution may assist with the inputting of information from provided by the customer.

In some embodiments, transmitter 120 includes one or more directional antenna or beam antenna. That is, transmitter 120 includes at least an antenna that radiates or receives greater power in specific directions allowing increased performance and reduced interference from unwanted sources. In some embodiments, transmitter 120 is configured to transmit a radiofrequency (RF) signal in only one direction, within a range of about ten percent or less from the direction. In some embodiments, transmitter 120 can include a directional antenna with a focused, narrow radiowave beam width, such as a high-gain antenna (HGA), permitting more precise targeting of the radio signals. However, embodiments of the present invention are not limited to this configuration and dipole, low-gain antenna (LGA), or any other transmitting device can be used.

Figure 2:
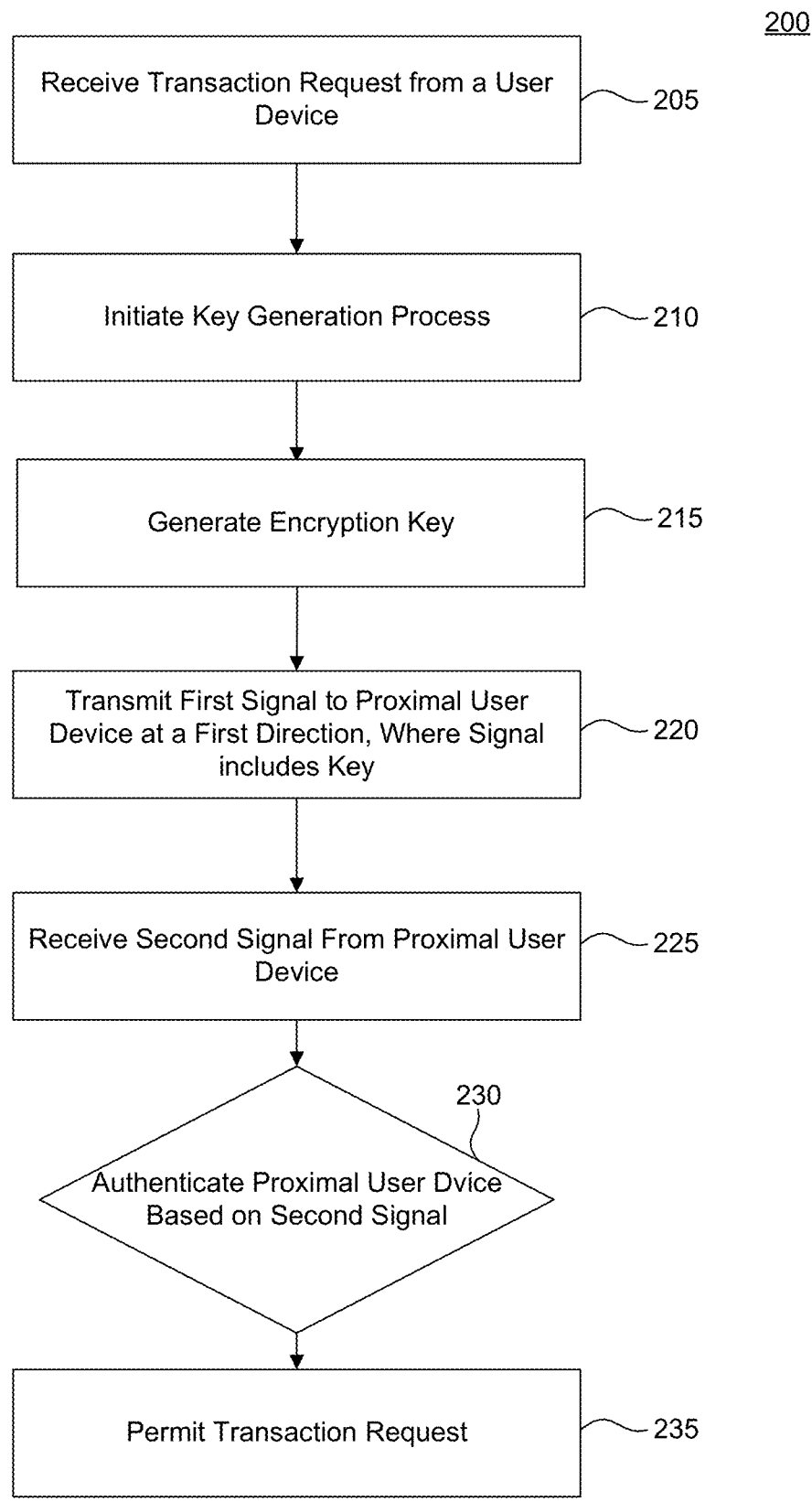
FIG. 2 is a flow diagram of a method for providing cardless ATM authentication, according to some embodiments.

FIG. 2 is a flowchart illustrating steps of a cardless ATM customer authentication method 200, by which an ATM system verifies and authenticates a customer attempting to operate a terminal system 100, in accordance with an embodiment. It is to be appreciated the process may not execute all steps shown or in the order shown, and may execute additional steps.

Figure 3:
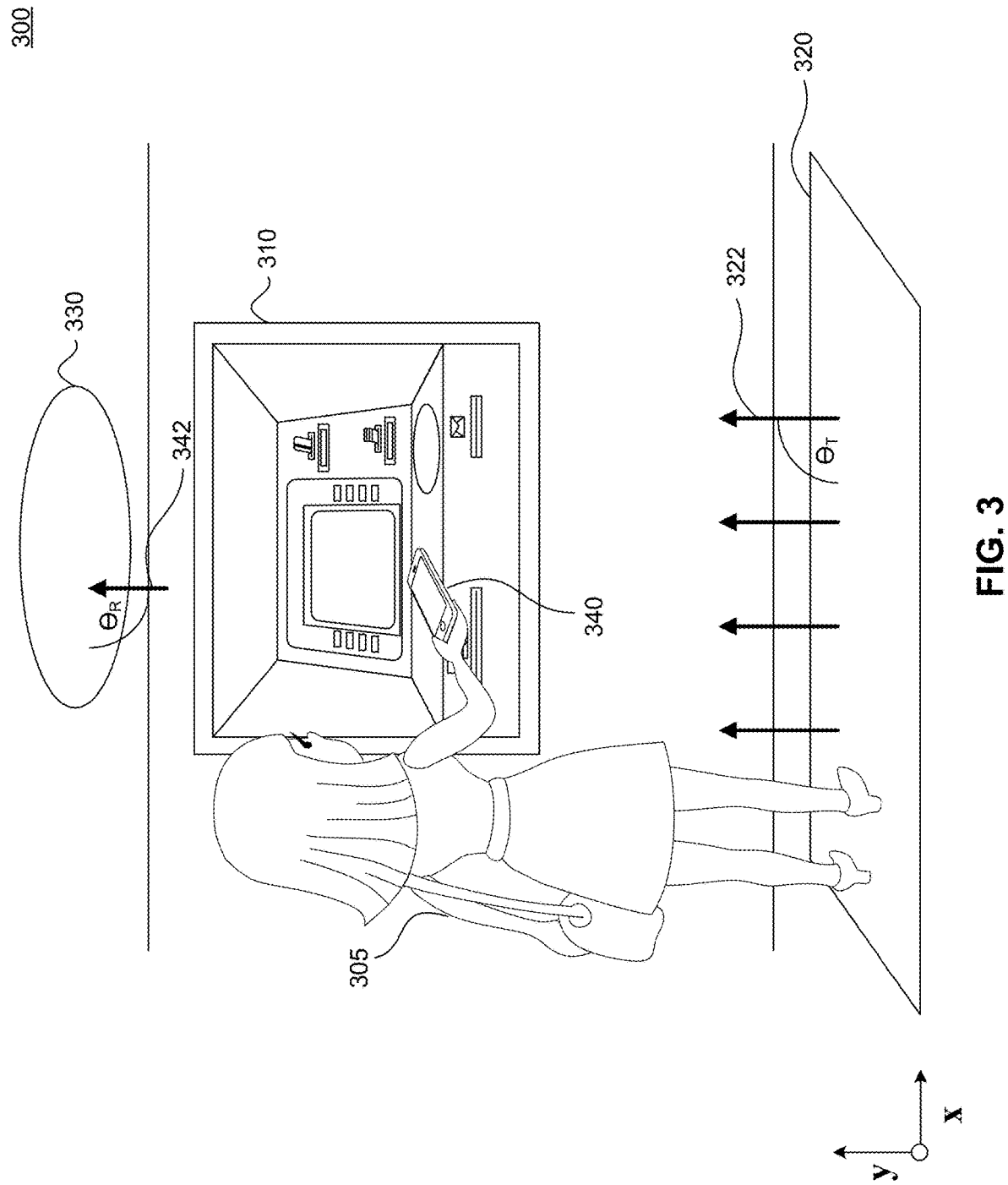
FIG. 3 illustrates a terminal system, in accordance with an embodiment.

Method 200 will be described with respect to FIG. 3, which illustrates an exemplary usage of terminal system 300. FIG. 3 is for illustrative purposes only and are not to scale. In addition, FIG. 3 may not reflect the actual geometry of the real structures, features, or layers. Some structures, layers, or geometries may have been deliberately augmented or omitted for illustrative and clarity purposes.

Referring to FIG. 3, exemplary transaction authentication method 200 begins with operation 205, where a transaction request is submitted by a user 305 to a financial institution. A transaction request may be presented to a financial institution by a user, who may be a customer of the financial institution, by a computerized process. In an exemplary embodiment described in greater detail with respect to FIGS. 3A through 3H below, a customer can initiate a transaction request by a mobile device 340. For example, user 305 can initiate a transaction request to withdraw an amount of cash from the financial institution. The transaction request can be initiated without constraint as to the location. For example, the transaction request can be initiated by user 305 from a home, office, financial institution, or any other location. In some embodiments, the transaction request can be initiated without limitation as to the location of the kiosk from which cash will be drawn.

As shown in FIG. 3, terminal system 300 can include a kiosk 310, a transmitter 320, and a receiver 330, which can be embodiments of kiosk 110, transmitter 120 and receiver 130, respectively. Transmitter 320 and receiver 330 can be connected to kiosk 310. For example, transmitter 320 and receiver 330 can be connected with kiosk to provide an interface through which a customer can associate with a bank. Kiosk 310 can be an ATM kiosk that can communicate with a portable device of a customer, such as user device 340, through transmitter 320 and receiver 330. The components and arrangement of the components included in terminal system 300 may vary. Thus, terminal system 300 may further include other components or devices that perform or assist in the performance of one or more processes consistent with the disclosed embodiments.

Referring to FIG. 3, exemplary transaction authentication method 200 continues with operation 210, where the presence of user 305 is detected relative to terminal system 300. Terminal system 300 can include a kiosk 310, a transmitter 320, and a receiver 330, which can be embodiments of kiosk 110, transmitter 120 and receiver 130, respectively.

In one non-limiting example, a sensor (not shown) is configured to detect the presence of a customer. In some embodiments, the sensor can be a piezoelectric element disposed within transmitter 320, in accordance with the above description. In other embodiments, the sensor can be an infrared (IR) sensor, motion detector, PIR-based motion detector, ultrasonic sensor, passive infrared (PIR) sensor, tomographic sensor, microwave sensor, or any other sensor or combinations thereof, configured to detect the presence of a customer at terminal system 200. In still other embodiments.

Exemplary transaction authentication method 200 continues with operation 215, where the detection of user 305 initiates a key generation process. A processor generates a key (e.g., first signal 322) to be used in the authentication of user device 340 before carrying out one or more financial transactions. Embodiments are not limited with respect to a specific key generation algorithm. For example, in some embodiments, a symmetric-key algorithm can be used to generate an encryption key. In some embodiments, the encryption key can be either partially or entirely randomly generated using any random number generator (RNG) or pseudorandom number generator (PRNG), including known PRNGs such as Yarrow, Blum, Shub, or Lagged Fibonacci generators. Additionally, key generation protocols can include cipher protocol, such as a block cipher, stream cipher, linear-feedback shift register (LFSR), or any other cipher protocol.

Transaction authentication method 200 continues with operation 220, where a first signal 322 is transmitted from transmitter 320 to user device 340 in a first direction (e.g., $\Theta_T$). First signal 322 can include the key generated by a key generation process, as described above. Transmitter 320 can include a directional antenna that is configured to transmit first signal 322 in a specific direction, such that user device 340 is only enabled to acquire first signal 322 when disposed at a specific location relative to transmitter 320.

In some embodiments, transmitter 320 is configured to transmit an RF signal in only one direction, within a range of about ten percent or less from the direction. In a non-limiting example, transmitter 320 includes a directional antenna configured to transmit first signal 322 upward, where user device 340 is only enabled to acquire first signal 322 when disposed above transmitter 320. Specifically, transmitter 320 can be disposed in a floor mat and include a directional antenna configured to transmit first signal 322. A directional antenna of transmitter 320 is configured to transmit first signal 322 in a direction (y) orthogonal to the floor (e.g., at an angle $\Theta_T$ that is between about 80° and about 100° to the floor, or between about 85° and 95° to the floor, or at an angle about 90° to the floor). Thereby, user device 340 generally is enabled to receive first signal 222 when positioned over transmitter 320.

Transaction authentication method 200 continues with operation 225, where a password based on key 322 is transmitted from user device 340 as second signal 342. Second signal 342 can be received from user device 340 by receiver 330 at a second direction. In some embodiments, the second direction can be identical or substantially identical to the first direction. In other embodiments, the second direction can be different from the first direction. Like transmitter 320, receiver 330 can include a directional antenna that is configured to receive second signal 342 in a specific direction only when user device 340 disposed at a specific location relative to receiver 330.

In some embodiments, receiver 330 is configured to receive an RF signal in only one direction, within a range of about ten percent or less from the direction. In a non-limiting example, receiver 330 includes a directional antenna configured to receive second signal 342 upward, where receiver 330 is enabled to receive second signal 342 primarily when user device 340 is situated below receiver 330. Specifically, transmitter 320 can be disposed overhead (e.g., in a ceiling or overhead structure) and include a directional antenna configured to receive second signal 322. A directional antenna of receiver 330 is configured to receive second signal 342 in a direction (y) orthogonal to the ceiling (e.g., at an angle $\Theta_R$ that is between about 80° and about 100° to the ceiling, or between about 85° and 95° to the ceiling, or at an angle about 90° to the ceiling). Thereby, receiver 330 generally is enabled to receive second signal 342 when positioned over user device 340.

Referring to FIG. 3, exemplary transaction authentication method 200 continues with operation 230, where the password transmitted from user device 340 in second signal, and received by receiver 330 in operation 225, is compared to a password is matched to the user's credentials. If the password is verified to match the user's credentials, then the kiosk authenticates the user and enables the user to complete the financial transaction request. For example, after verifying the password, the kiosk can perform an operation to complete the cash withdrawal transaction that was initiated in operation 305 above. Thus, transaction authentication method 200 enables a kiosk 310 to perform a financial transaction initiated by user device 340 only when the user device 340 is present at a location relative to the kiosk, to ensure that user 305 is present. By enabling the financial transaction only when the user 305 corresponding to the transaction is present in front of the ATM, financial losses and risk to financial institutions and their clients can be reduced.

Figure 4:
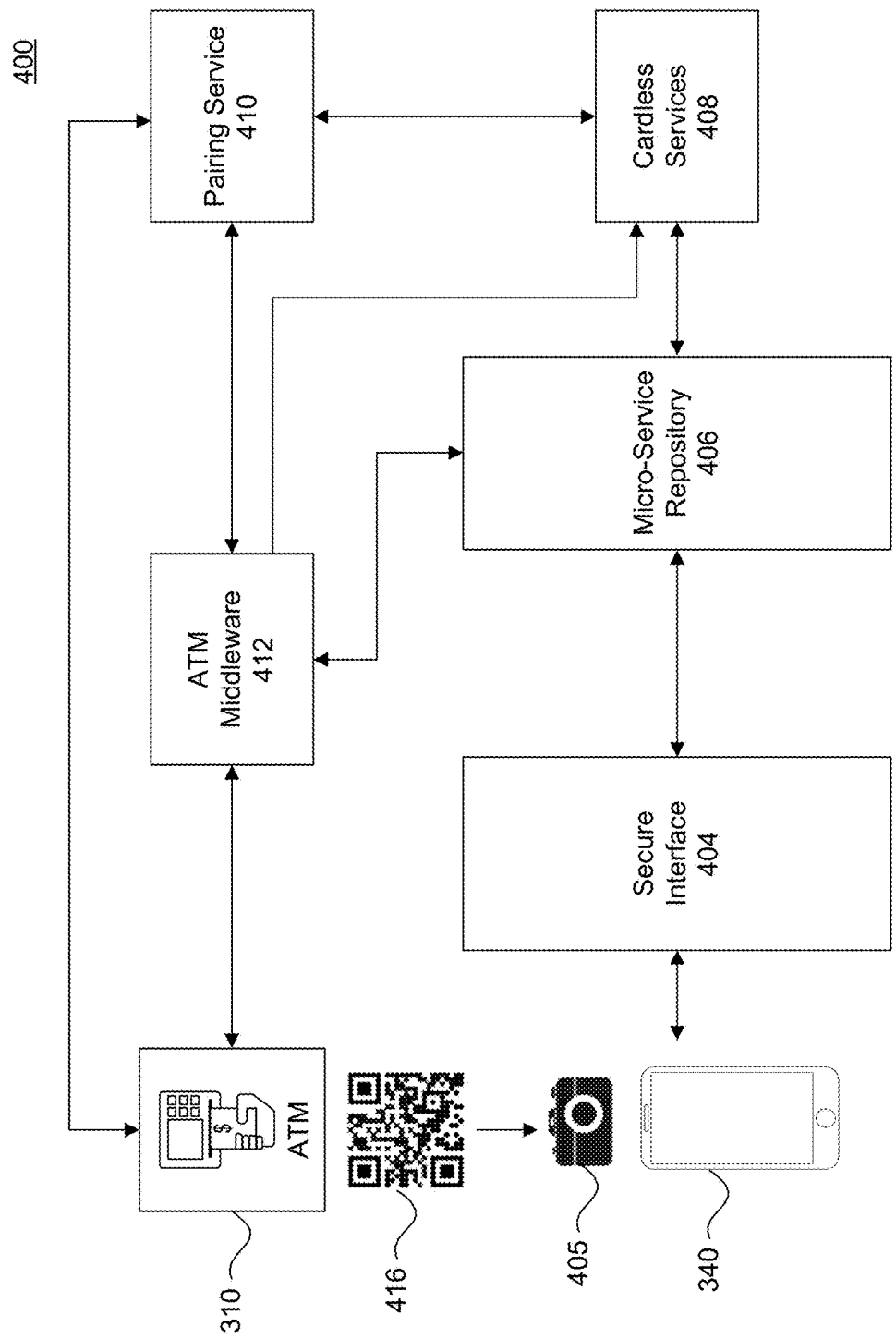
FIG. 4 illustrates a cardless ATM system, in accordance with an embodiment.

FIG. 4 illustrates a cardless ATM system 400, in accordance with an embodiment. In an embodiment, mobile device 340 is used by an account holder of a banking institution to conduct online banking. Specifically, mobile device 340 will typically have a mobile application ("app") installed thereon and usable for interacting with the banking institution for performing banking transactions on a user account holder's accounts.

In some embodiments, mobile device 340 interacts with the banking institution through a secure interface 404. Secure interface 404 can provide facilities for securely communicating with the banking institution's backend systems to conduct transactions, and also protects the banking institution's backend systems from improper access attempts (e.g., distributed denial of service (DDoS) attacks, injection attacks, etc.)

In an embodiment, interaction with the banking institution's backend systems through secure interface 404 is accomplished through a variety of micro-services provided by micro-service repository 406. For example, cardless services 408 allow mobile device 340 to interact with an ATM 310 without the need to have a physical ATM card as an authentication mechanism for the account holder.

Specifically, cardless services 408 can allow the user account holder to authenticate themselves to the banking institution using authentication procedures within an app installed on mobile device 340. By way of non-limiting example, this may include a username and password based login, biometric recognition, access key, and other authentication mechanisms, including the use of multiple authentication mechanisms in a multi-factor authentication scheme. A skilled artisan will appreciate that a variety of authentication mechanisms may be employed at mobile device 340 in order to ensure that the user is authorized to access their specific account through cardless services 408.

In an embodiment, an authenticated user on mobile device 340 may request a transaction through cardless services 408 that needs to be serviced through ATM 310 (such as a cash withdrawal). Since the authenticated user is known to the banking institution as having proper access to perform the transaction, even without the use of an ATM card, cardless services 408 can inform ATM 310 that the authenticated user is permitted to complete the transaction at ATM 310.

In order to complete the transaction, cardless services 408 can pair the transaction to ATM 310 to allow completion of the transaction at ATM 310. And if, with pairing complete through pairing service 410, cardless services 408 issues a request for ATM 310 to perform a specific transaction (e.g., providing cash to complete a cash withdrawal transaction), the instructions can be provided through ATM middleware 412 to direct the behavior of ATM 310.

In accordance with an embodiment, pairing service 410 handles pairing of transactions from mobile device 340 with ATM 310 through the use of a barcode or other unique identifying information obtained from ATM 310 and provided through mobile device 340 as confirmation. For example, ATM 310 may display a barcode, such as QR code 416, on its screen. This barcode includes an identifier associated with ATM 310. When mobile device 340 has prepared a transaction for performance through cardless services 408, the mobile app executing on mobile device 340 may instruct the authenticated user to visit ATM 310 to complete the transaction. A skilled artisan will recognize that, although the disclosure herein is presented principally by way of barcodes (which include special cases of barcodes, such as QR codes), other forms of coding may be used in place of barcodes to equivalent effect.

In this embodiment, upon arriving at ATM 310, the user of mobile device 340 is presented with QR code 416 on the display screen of ATM 310. The mobile app executing on mobile device 340 may present the user with an option for obtaining this QR code 416 (or other code) from the ATM 310. For example, the mobile app may access a camera feature to allow the user to scan QR code 416 using a camera 403 built into mobile device 340. The mobile device 340 sends this QR code to cardless services 408 and on to pairing service 410, which recognizes the identifier for ATM 310 in scanned QR code 416. Accordingly, pairing service 410 is able to pair the transaction initiated from mobile device 340 with ATM 310 specifically on the basis of the identifier.

In a further embodiment, QR code 416 (or other form of barcode) may be read by a barcode reader 418. Barcodes, such as QR codes, that are formed in accordance with a specific standard are commonly readable by any reader that itself conforms to the barcode standards. For example, if barcode reader 418 is capable of reading QR codes such as QR code 416, then barcode reader 418 would be able to obtain raw data present in any such QR code. Accordingly, a skilled artisan would understand that barcode reader 418 is any form of device capable of reading a barcode (such as QR code 416) displayed on ATM 310, and may include devices such as a handheld barcode scan tool or a mobile phone with an installed application capable of reading and processing the barcode.

Figure 5F:
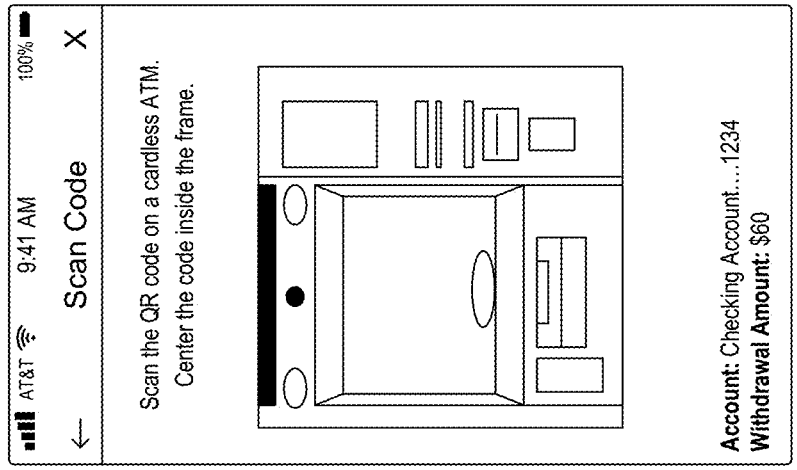

FIGS. 5A through 5H illustrate a wireframe of a mobile device ATM fulfillment process, in accordance with an embodiment. FIG. 5A shows an exemplary home screen for a mobile app used for banking on a mobile device, such as mobile device 340 of FIG. 4. From this screen, a user of the mobile app may select a transaction that requires an ATM for fulfillment—in this case, "Get Cash at an ATM." FIG. 5B shows an exemplary screen allowing the user to select an account from which to perform the ATM withdrawal. FIG. 5C shows an exemplary screen for selecting an amount for the ATM cash withdrawal, while FIG. 5D shows an exemplary screen for confirming details of the withdrawal (including the account and the amount selected).

Figure 5E:
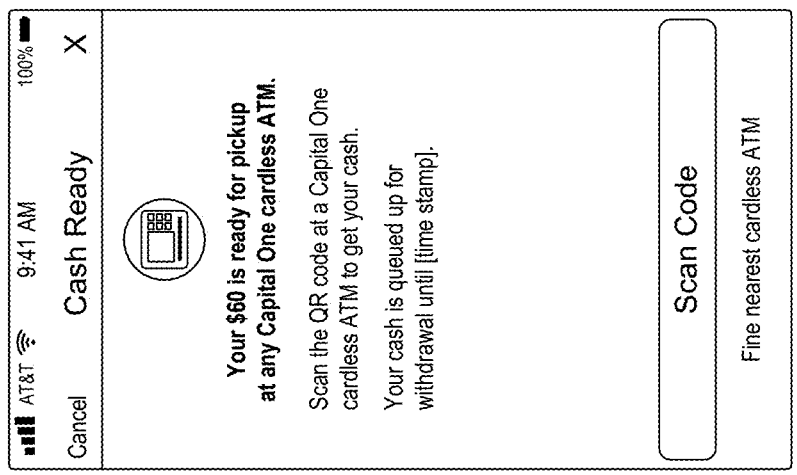
Figure 5H:
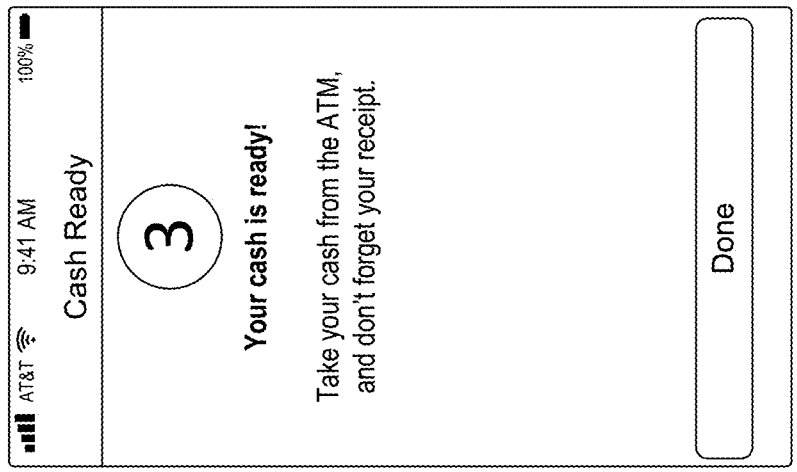

FIG. 5E shows an exemplary screen notifying the user that the transaction has been approved, and is ready to be completed at an ATM. This screen also provides an option allowing the user to scan a code, which, once selected, navigates to the exemplary screen of FIG. 5F. The exemplary screen of FIG. 5F shows a camera feature allowing the user to approach the ATM with their mobile device to scan the code (e.g., a QR code) shown on the ATM display. And the exemplary screen of FIG. 5H shows a confirmation screen indicating that the transaction has been completed by the ATM.

Figure 5G:
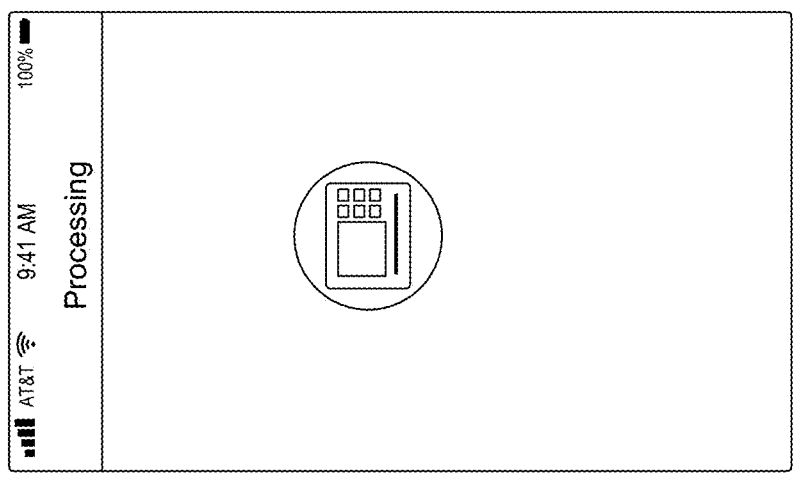

As discussed in the context of FIG. 4, in an embodiment pairing service 410 uses an identifier for ATM 310 obtained by mobile device 340 (e.g., by scanning QR code 416 with an embedded identifier, using camera 405 of mobile device 340) to pair ATM 310 with the transaction provided by mobile device 340. In this embodiment, the exemplary screens of FIGS. 5A-5E illustrate the process of preparing the transaction for fulfillment by ATM 310, and FIGS. 5F-5H illustrate the process of pairing the specific ATM 310 to the transaction of mobile device 340 by scanning QR code 416 using camera 405 of mobile device 340.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. For ease of description only, all scenarios will be discussed as processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

EXAMPLES

Figure 6:
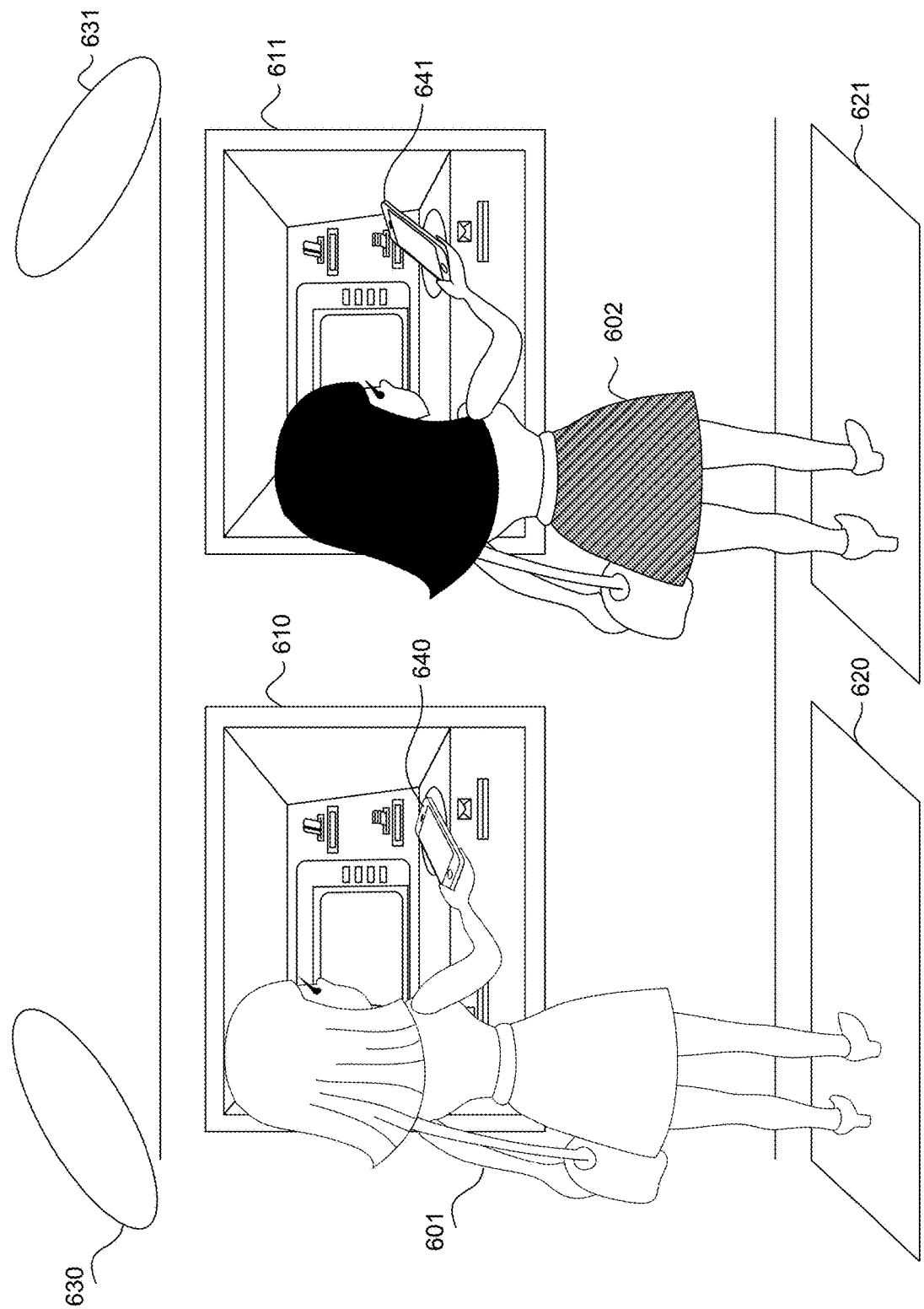
FIG. 6 illustrates a terminal system, in accordance with an embodiment.

FIG. 6 illustrates exemplary usage of a cardless ATM cardless authentication system 600, by which an ATM system verifies and authenticates a customer, in accordance with an embodiment.

A financial institution can receive transaction requests independently submitted by a user 601 and a user 602. For example, user 601 may submit a transaction request from her home, to draw some amount of cash from an ATM kiosk, while user 602 may submit a transaction request from her automobile to perform a deposit.

Cardless ATM cardless authentication system 600 can include first kiosk 610, first transmitter 620, and first receiver 630, and second kiosk 611, second transmitter 621, and second receiver 631. First transmitter 620 and first receiver 630 can be connected to first kiosk 610, while second transmitter 621 and second receiver 631 can be connected to second kiosk 611. Upon arrival at kiosk 610, a sensor (not shown) can detect the presence of one or more users 601 and 602. For example, a sensor in transmitter 620 can be provided to detect the presence of a user at kiosk 610. In this example, a piezoelectric element disposed within transmitter 620 initiates an electric signal to kiosk 610 indicating the presence of user 601 standing on transmitter 620.

Based on the detection, a key can be generated by kiosk 610 for transmission by transmitter 620 to user device 640 controlled by user 601. One or more processors generates a key to be used in the authentication of user device 640 before carrying out one or more financial transactions. For example, an encryption key is randomly generated using a PRNG such as a linear-feedback shift register (LFSR) or other cipher protocol. A signal including the key is transmitted by transmitter 620 to user device 640 in a first direction. Transmitter 620 can include a directional antenna that is configured to transmit a first signal in a specific direction, such that user device 640 is only enabled to acquire a first signal when disposed at a specific location relative to transmitter 620.

As described above, transmitter 620 is configured to transmit an RF signal in only one direction, within a range of about ten percent or less from the direction. Transmitter 620 includes a directional antenna configured to transmit a first signal, where user device 640 is only enabled to acquire first signal when disposed above transmitter 620. Specifically, transmitter 620 can be disposed in a floor mat and include a directional antenna configured to transmit first signal. A directional antenna of transmitter 620 is configured to transmit first signal in a direction (y) orthogonal to the floor (e.g., at an angle between about 80° and about 100° to the floor, or between about 85° and 95° to the floor, or at an angle about 90° to the floor). Thereby, user device 640 generally is enabled to receive first signal when positioned over transmitter 620. Transmitter 621 is similarly configured to transmit only to a direction enabled to reach a device operated by a user standing in front of kiosk 611 (e.g., user 602) such that user device 641 generally is enabled to receive a signal transmitted by transmitter 621.

User device 640 receives the key and generates a one-time-password (OTP) that is cryptographically combined with the key using a one-way function hash function. For example, user device 640 can generate a signal based on the key and OTP using a SHA function. The cryptographically combined one-time-password is transmitted from user device 640 to receiver 630. Because receiver is positioned relative to the expected location of a user of kiosk 610, a directional antenna of receiver 630 is oriented to receive signals from that expected location.

In some embodiments, an antenna of receiver 630 is configured to not receive signals outside some threshold variance from that expected location (e.g., from outside 10% of a center point of a given location). Specifically, receiver 630 includes a directional antenna configured to receive the second signal only from a user standing in front of kiosk 610. Specifically, transmitter 620 can be disposed overhead, beside, at any given orientation and include a directional antenna such that a signal can be received only from a location proximal relative to kiosk 610. Thereby, receiver 630 is enabled to receive a second signal from user device 640.

Then, based on the OTP transmitted from user device 640 in second signal, and received by receiver 630, the credentials of user 601 are confirmed enabling the user to complete the financial transaction request.

Likewise, user device 641 of user 602 generates a separate OTP that is cryptographically combined with a separate key received from transmitter 621. The OTP is also generated using a one-way function hash function. The OTP generated by user device 641 can be transmitted to receiver 631, which is oriented to receive signals from the expected location of user device 641. Thereby, the credentials of user 602 are confirmed enabling the user to complete the financial transaction request.

In this manner, cardless ATM cardless authentication system 600 is configured to enable a user's financial transaction to be performed only by an ATM kiosk where the user is present. By enabling the financial transaction only when the corresponding user is present in front of the ATM, security is improved.

A system includes a kiosk that includes a processor. The processor is configured to perform an electronic payment transaction based on instructions received from a portable device of a user. The system further includes a transmitting device electrically coupled to the kiosk. The transmitting device is configured to transmit a first signal to the portable device at a first direction. The system further includes a receiving device electrically coupled to the kiosk. The receiving device is configured to receive a second signal from the portable device at a second direction. The transmitting device and receiving device are positioned such that the first and second direction enable determination of a position of the user, where the processor enables the electronic payment transaction to be processed only when the portable device is at a location relative to the kiosk. The location is disposed within a transmission path coextensive with both the first direction and the second direction.

A computer-implemented method includes receiving, by a portable device, an input from a user, the input including an instruction for an electronic payment transaction, transmitting, by the portable device, a transaction request to a kiosk, the kiosk including one or more computing devices, the transaction request including the instruction for the electronic payment transaction. The method includes receiving, by the portable device, an encryption key from a transmitting device of the kiosk, the encryption key received from the transmitting device at a first direction; The method further includes generating, by the portable device, a key response based on the encryption key. The method additionally includes transmitting, by the portable device, the key response to a receiving device of the kiosk, the key response transmitted at a second direction. The receiving the encryption key from the first direction and the transmitting the response key at the second direction enable determination of a proximity of the user to the kiosk. The transmitting the response key enables the kiosk to process the electronic payment transaction based on the proximity of the user to the kiosk.

A computer-implemented method includes receiving, by one or more computing devices, a transaction request from a user, the transaction request submitted by the user on a portable device. The method includes receiving, from a sensor electrically coupled to the one or more computing devices, an initiation signal to indicate the proximity of the user; generating, by the one or more computing devices, an encryption key based on the transaction request and in response to the initiation signal. The method also includes transmitting, by a transmitting device electrically coupled to the one or more computing devices, the encryption key to the portable device. The method further includes receiving, by a receiving device electrically coupled to the one or more computing devices, a key response from the portable device. The method includes additionally authenticating, by the one or more computing devices, the portable device based on the encryption key and the key response to establish a secure binding between the portable device and the one or more computing devices.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system comprising:
    a kiosk, the kiosk comprising a processor, the processor configured to perform an electronic payment transaction based on instructions received from a portable device of a user;
    a transmitting device electrically coupled to the kiosk, the transmitting device configured to transmit a first signal to the portable device at a first direction; and
    a receiving device electrically coupled to the kiosk, the receiving device configured to receive a second signal from the portable device at a second direction, wherein the transmitting device and receiving device are positioned such that the first and second direction enable determination of a position of the user,
    wherein the processor enables the electronic payment transaction to be processed only when the portable device is at a location relative to the kiosk, and
    wherein the location is disposed within a transmission path coextensive with both the first direction and the second direction.

2. The system of claim 1, wherein the transmitting device transmits the first signal based on an instruction received from the kiosk.

3. The system of claim 1, wherein the transmitting device and receiving device are positioned to enable the kiosk, by the processor, to triangulate a position of the user.

4. The system of claim 1, wherein the receiving device is disposed over the transmitting device in a direction extending linearly with the first direction and the second direction.

5. The system of claim 1, wherein:
    the kiosk, based on an initiation signal received from the transmitting device, generates an encryption key,
    the transmitting device, based on an instruction received from the kiosk, transmits the first signal, the first signal comprising the encryption key, and
    the processor, based on the second signal received from the portable device, establishes a secure binding between the kiosk and the portable device, the secure binding enabling processing of the electronic payment transaction.

6. The system of claim 5, wherein the processor determines, based on the second signal whether the user is in proximity of the kiosk, and, when the user is in proximity of the kiosk, authorizes the electronic payment transaction.

7. The system of claim 5, wherein the transmitting device is configured to transmit the first signal, by a directional antenna, to the portable device disposed over the directional antenna.

8. The system of claim 1, wherein the transmitting device comprises a base member, a directional antenna electrically coupled to the kiosk, and a piezoelectric sensor electrically coupled to the kiosk.

9. A computer-implemented method comprising:
receiving, by a portable device, an input from a user, the input including an instruction for an electronic payment transaction;
transmitting, by the portable device, a transaction request to a kiosk, the kiosk comprising one or more computing devices, the transaction request including the instruction for the electronic payment transaction;
receiving, by the portable device, an encryption key from a transmitting device of the kiosk, the encryption key received from the transmitting device at a first direction;
generating, by the portable device, a key response based on the encryption key; and
transmitting, by the portable device, the key response to a receiving device of the kiosk, the key response transmitted at a second direction,
wherein the receiving the encryption key from the first direction and the transmitting the response key at the second direction enable determination of a proximity of the user to the kiosk, and
wherein the transmitting the response key enables the kiosk to process the electronic payment transaction based on the proximity of the user to the kiosk.

10. The method of claim 9, wherein the generating the response key comprises generating a response key to enable the kiosk to perform a two-factor authentication with information associated with the user.

11. The method of claim 9, wherein the generating the response key comprises generating a one-time password (OTP) based on the information associated with the user.

12. The method of claim 9, further comprising:
generating an image signal associated with the transaction request; and
transmitting the image signal scanned to a camera of the kiosk,
wherein the transmitting the image signal enables the kiosk to transmit the encryption key.

13. The method of claim 9, wherein:
the receiving the encryption key comprises receiving the encryption key transmitted from a directional antenna of the transmitting device from the first direction,
the transmitting the response key comprises transmitting the response key in the second direction, and
the first direction and the second direction enable the kiosk to triangulate a position of the user.

14. A computer-implemented method comprising:
receiving, by one or more computing devices, a transaction request from a user, the transaction request submitted by the user on a portable device;
receiving, from a sensor electrically coupled to the one or more computing devices, an initiation signal to indicate the proximity of the user;
generating, by the one or more computing devices, an encryption key based on the transaction request and in response to the initiation signal;
transmitting, at a first direction by a transmitting device electrically coupled to the one or more computing devices, the encryption key to the portable device;
receiving, at a second direction by a receiving device electrically coupled to the one or more computing devices, a key response from the portable device, wherein the transmitting device and receiving device are positioned such that the first and second direction enable determination of a position of the user; and
authenticating, by the one or more computing devices, the portable device based on the encryption key and the key response to establish a secure binding between the portable device and the one or more computing devices,
wherein the processor enables an electronic payment transaction to be processed only when the portable device is at a location relative to a kiosk, and wherein the location is disposed within a transmission path coextensive with both the first direction and the second direction.

15. The method of claim 14, further comprising prestaging, by a mobile application of the portable device, the transaction request to be submitted to the one or more computing devices.

16. The method of claim 14, further comprising scanning, by the one or more computing devices, an image signal presented by the portable device and associated with the transaction request.

17. The method of claim 16, wherein the image signal presented by the portable device and associated with the transaction request comprises a bar code.

18. The method of claim 14, further comprising authorizing, by the one or more computing devices, the transaction based on the authenticating the portable device, wherein the portable device is determined to be associated with the transaction request.

19. The method of claim 14, wherein the authentication comprises on performing a two-factor authentication with information associated with the user.

20. The method of claim 19, wherein the authentication comprises generating a one-time password (OTP) based on the information associated with the user.

* * * * *